(12) United States Patent
Fernandez et al.

(10) Patent No.: US 8,543,372 B1
(45) Date of Patent: Sep. 24, 2013

(54) SYSTEM DESIGN RIGHTS MANAGEMENT

(76) Inventors: Dennis S. Fernandez, Atherton, CA (US); Irene Y. Hu, Belmont, CA (US)

(*) Notice: Subject to any disclaimer, the term of this patent is extended or adjusted under 35 U.S.C. 154(b) by 2895 days.

(21) Appl. No.: 09/955,664

(22) Filed: Sep. 19, 2001

Related U.S. Application Data

(63) Continuation of application No. 09/080,714, filed on May 18, 1998, now abandoned.

(51) Int. Cl.
*G06F 9/455* (2006.01)

(52) U.S. Cl.
USPC .................................................. 703/26

(58) Field of Classification Search
USPC ............................................. 703/26, 13
See application file for complete search history.

(56) References Cited

U.S. PATENT DOCUMENTS

| | | | |
|---|---|---|---|
| 4,965,574 A | 10/1990 | Fukushima et al. | |
| 4,994,971 A | 2/1991 | Poelstra | |
| 5,243,538 A | 9/1993 | Okuzawa et al. | |
| 5,459,673 A | 10/1995 | Carmean et al. | |
| 5,526,277 A | 6/1996 | Dangelo et al. | |
| 5,526,514 A | 6/1996 | Pradhan et al. | |
| 5,530,520 A | 6/1996 | Clearwater et al. | |
| 5,539,429 A | 7/1996 | Yano et al. | |
| 5,555,201 A | 9/1996 | Dangelo et al. | |
| 5,557,518 A | 9/1996 | Rosen | |
| 5,563,801 A | 10/1996 | Lee et al. | |
| 5,634,012 A | 5/1997 | Stefik et al. | |
| 5,692,176 A | 11/1997 | Holt et al. | |
| 5,694,322 A | 12/1997 | Westerlage et al. | |
| 5,715,314 A | 2/1998 | Payne et al. | |
| 5,715,403 A | 2/1998 | Stefik | |
| 5,774,070 A | 6/1998 | Rendon | |
| 5,809,161 A | 9/1998 | Auty et al. | |
| 5,809,481 A | 9/1998 | Baron et al. | |
| 5,850,442 A | 12/1998 | Muftic | |
| 5,867,399 A * | 2/1999 | Rostoker et al. | 716/18 |
| 5,870,543 A * | 2/1999 | Ronning | 713/200 |
| 5,910,789 A | 6/1999 | Vigen | |
| 5,959,577 A | 9/1999 | Fan et al. | |
| 5,970,481 A | 10/1999 | Westerlage et al. | |
| 5,978,476 A | 11/1999 | Redman et al. | |
| 5,982,891 A * | 11/1999 | Ginter et al. | 705/54 |
| 6,006,205 A | 12/1999 | Loeb et al. | |
| 6,006,332 A | 12/1999 | Rabne et al. | |
| 6,018,697 A | 1/2000 | Morimoto et al. | |
| 6,023,565 A | 2/2000 | Lawman et al. | |
| 6,055,426 A | 4/2000 | Beasley | |
| 6,144,954 A | 11/2000 | Li | |
| 6,249,241 B1 | 6/2001 | Jordan et al. | |
| 6,386,882 B1 | 5/2002 | Linberg | |
| 2001/0010541 A1 | 8/2001 | Fernandez et al. | |

(Continued)

OTHER PUBLICATIONS

"Wireless ATM—an overview" Awater et al. 1996. Mobile Networks and Applications. pp. 235-243.*

(Continued)

*Primary Examiner* — Saif Alhija
(74) *Attorney, Agent, or Firm* — Fernandez & Associates, LLP

(57) ABSTRACT

Development software compares prototype functionality to module library to pre-qualify design rights. Functional equivalence is determined at different abstraction levels. When equivalence is determined at one level, but not another level, functionality may be modified. Software may configure actual prototype per modified design. Network database provides on-line transaction and delivery of licensed design, preferably according to manufacturing parameters.

2 Claims, 5 Drawing Sheets

(56) References Cited

U.S. PATENT DOCUMENTS

| | | |
|---|---|---|
| 2001/0022615 A1 | 9/2001 | Fernandez et al. |
| 2001/0029613 A1 | 10/2001 | Fernandez et al. |
| 2002/0057340 A1 | 5/2002 | Fernandez et al. |
| 2002/0120925 A1 | 8/2002 | Logan |
| 2004/0153552 A1 | 8/2004 | Trossen et al. |
| 2004/0199471 A1 | 10/2004 | Hardjono |

OTHER PUBLICATIONS

"Intellectual Property Protection in the EDA Industry"; Dennis S. Fernandez; 31$^{st}$ ACM/IEEE Design Automation Conference; 1994.

"VSI Alliance™ Architecture Document"; Version 1.0 ; Copyright 1997@VSI Alliance™.

"Cadence Implements Hardware and Software Co-Verifcation Strategy for System-On-A-Chip"; Laurig Stanley; HTTP://www.edac.org/EDAC/News/980317Cadence.html.; Copyright 1998. Cadence Design Systems, Inc. Marketing Systems.

IP Also Stands for "Intense Pain"; Richard Goering; HTTP://techweb.cmp.com/eet/news/98/1007news/ip.html.

ATMEL's FPGA Strategy Builds on IP Design Centers; Peter Clarke; http://techweb.cmp.com/eet/news/98/1007news/fpga.html.

IP News: Web-Based IP Catalog Started; Jim Tully, Dataquest http://www.design-reuse.com/NEWS/news27_10_97.html.

"Living in Interesting Times"; Prof. A. Richard Newton; ACM/IEEE Design Automation Conference; Keynote Presentation: Jun. 1995; http://www.cad.eecs.berkeley.edu/~newton/presentations/DAC key text.htm.

"ARPA Project Summary Distributed Design of Electronic Systems Sep. 1995-Jan. 1996"; A. Richard Newton, rnewton@ic.eecs. Berkeley.edu http://www-cad.eecs.Berkeley.edu/Respep/Research/weld/summaries/9601.html.

EDA and the Network; Mark D. Spiller and A. Richard Newton; 1997 IEEE/ACM ICCAD pp. 470-476, San Jose, CA Nov. 1997.

Dennis Fernandez, "Intellectual Property Protection in the EDA Industry," 31st ACM/IEEE Design Automation Conference, 1994, pp. 161-163.

"VSI Alliance Architecture Document" Version 1.0, 1997.

"Cadence Implements Hardware and Software Co-Verification Strategy for System-On-A-Chip," Press release, Mar. 17, 1998, internet site: http://www.edac.org/EDAC/News/980317Cadence.html.

"Synopsys offers IP Providers Secure, Efficient Model Path From Design Source to End User," Press release, Apr. 13, 1998, internet site: http://www.edac.org/EDAC/News/980413Synopsys.html.

Richard Goering, "IP Also Stands for "Intense Pain"," Press Release, May 14, 1998, internet site: http://kchweb.cmp.com/eet/News/98/1007news/ip.html.

Peter Clarke, "Atmel's FPGA Strategy Builds on IP Design Centers," May 15, 1998, Press Release, internet site: http://techweb.cmp.com/eet/news/98/1007news/fpga.html.

Jim Tully, "Web-based IP Catalog started," IP News, Oct. 27, 1997 Press release, internet site: http://www.design-reuse.com/NEWS/news27_10_97.html.

"Design and Reuse announces the next step: A Catalog of pre-qualified IPs on the Web;" Press Release, Jan. 5, 1998, internet site: http://www.design-reuse.com/NEWS/news05_01_98.html.

"Rapid and CMP Media's EDTN Network Launch Virtual Component Catalog," Mar. 25, 1998, Press Release, internet site: http://www.rapid.org/catalogrelease.html.

Aadil Amoura, et al. "A Catalog Generator for Electronic Virtual Components," Press release, May 2, 1998, internet site: http://www.design-reuse.com/NEWS/news02_05_98.html.

A. Richard Newton, "Living in Interesting Times," ACM/IEEE Design Automation Conference, Jun. 1995, internet site: http://www-cad.eecs.berkeley.edu/~newton/presentations/DACKeyText.html.

A. Richard Newton, "ARPA Project Summary, Distributed Design of Electronic Systems, Sep. 1995-Jan. 1996," internet site: http://www-cad.EECS.Berkeley.EDU/Respep/Research/weld/Summariers/9601.html.

Mark D. Spiller, A. Richard Newton, "EDA and the Network," IEEE/ACM International Conference on Computer Aided Design, pp. 470-476, San Jose, CA Nov. 1997.

1997 Project Summary,Globally Distributed Microsystem Design: Proof-of-Concept (VELA Project), North Carolina State University, internet site: http://www.darpa.mil/ito/summaries97/F458_0.html.

Synopsis Offers IP Providers Secure, Efficient Model Path From Design Source to End User; http://edac.org/EDAC?News/980413Synopsys.html (1998).

IP News: Design and Reuse Announces the Next Step: A Catlog of Pre-Qulaified IP's on the Web; http://www.design-reuse.com/news/news05_01_98.html (May 1, 1998).

Kristen Parsely & Steve Rubel, Rapid and CMP Media's Edtn Network Launch Virtual Component Catalog; http://www.rapid.org/catalogrelease.html (1997).

Peter Blake, IP News; Intellectual Property—'Rapid' Industry Group Stirs Competition with Established Internet Lists—IP Core Ctalog Adds Net Access, E-Commerce; http://www.design-reuse.com/news/news06_04_98.html (Jun. 4, 1998).

Aadil Amoura, Bel Gacem B, bba, Philippe Coeurdeuay, and Gabrield Saucier, IP News; A Catalog Generator for Electronic Virtual Components; Design & Reuse; http://www.design-reuse.com/news/news02_05_98.html (Feb. 5, 1998).

Peter Clarke, Intellectual Property—'Rapid Transit Group Stirs Competition with Established Internet Lists—IP Core Catalog Adds New Access, E-Commerce; http://www.design-reuse.com/news/news06_04_98.html (Jun. 4, 1998).

U.S. Appl. No. 09/080,714, filed May 18, 1998, Fernandez et al.

U.S. Appl. No. 10/913,682, filed Aug. 5, 2004, Fernandez et al.

U.S. Appl. No. 11/585,554, filed Oct. 23, 2006, Fernandez et al.

Brglez et al. 1997 Project Summary, Globally Distributed Microsystem Design: Proof-of-Concept (VELA Project). North Carolina State Universityv [online], Aug. 1997 [retrieved on Jun. 18, 1998]. Retrieved from the Internet: <URL: http://www.darpa.mil/ito/Summaries97/F458-0.html>.

* cited by examiner

SYSTEM DESIGN RIGHTS MANAGEMENT

This application is a continuation of U.S. patent application Ser. No. 09/080,714, entitled "SYSTEM DESIGN RIGHTS MANAGEMENT", by Irene H. Fernandez (also known as Irene Y. Hu) and Dennis S. Fernandez, filed on May 18, 1998 now abandoned.

FIELD OF INVENTION

The invention relates to product development scheme and integrated platform for managing design rights and associated network transactions.

BACKGROUND OF INVENTION

Prototype system development typically entails substantial functional definition and verification, whereby certain intellectual property rights are created and used. For example, during conventional electronic system, circuit and/or software design, particularly using computer-automated tools, various functional components and interconnection, including physical representation thereof, are specified, synthesized, laid-out, simulated, tested, and modified to produce prototype product. Similarly, in other scientific and industrial applications, such as mechanical, medical, transportation, communications, and other technological areas involving system development, where product prototyping typically involves use of advanced design tools, certain rights typically arise during product design.

However, as system development becomes more complex and integrated, particularly in case of single- or multi-chip electronic system designs, where very large number of functional components and signal connections are increasingly incorporated, there is need for improved management of rights used and/or arising from complex system design.

SUMMARY OF INVENTION

The invention resides in software-implemented product development scheme and integrated platform for managing design rights and conducting associated network transactions. Prototype product design functionality is compared to set of other product design functionalities, effectively to prequalify rights associated with such prototype design. Functional equivalence between prototype functionality and other product functionalities is determined at multiple corresponding abstraction levels. When equivalence is determined at one level, but not at another level, design functionality is modified, and prototype actually coupled thereto is modified accordingly. Various processors may access network database for transacting on-line delivery of licensed design, preferably characterized according to particular manufacturing process.

DETAILED DESCRIPTION

Figure 1:
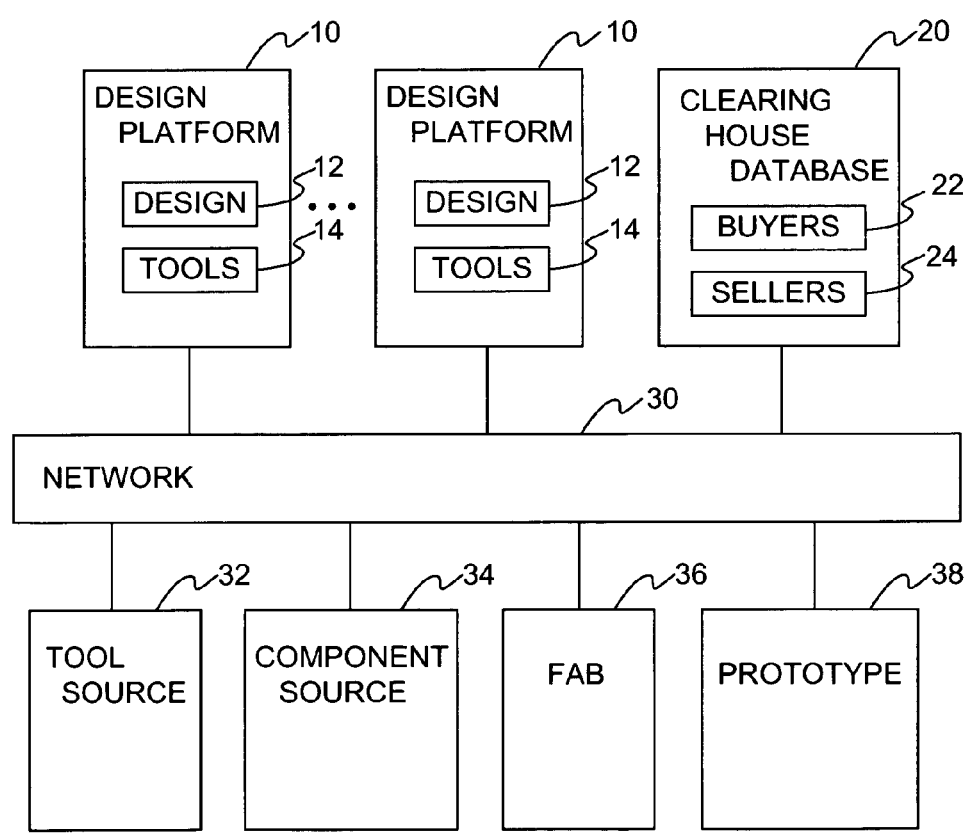
FIG. 1 is a top-level block diagram of an integrated network platform for product development, rights management, and distributed transactions according to the present invention.

FIG. 1 shows integrated network system for implementing functional design rights management and on-line module delivery, including one or more design platforms 10 coupled to network 30. Also accessible electronically and coupled thereto are database 20, tool source 32, component source 34, fabrication site 36, and product prototype 38.

Design platform 10 is embodied in one or more conventional engineering workstation, personal computer, or other programmable processing unit, including processor, operating system/BIOS, storage, as well as devices, drivers and/or software for user input/output interface, networking and communications. In addition, platform 10 includes one or more software and/or hardware tools 14 for product function development and/or verification provided as computer-aided design and engineering programs. Such programs are used for electronic circuit and/or system design, schematic capture, logic, behavioral or other functional synthesis, schematic capture, simulation, emulation, testing, placement, routing, timing analysis, and other related or necessary tool for defining, modifying, or checking product or prototype functionality, associated signal interconnection and/or transmission, and physical implementation as represented in electrical or electronic signal, instruction, program or other file format.

Furthermore, platform 10 comprise, include, or access one or more designs 12, which include one or more electrical or electronic signal, instruction, program or other computer-readable representation, specification, or characterization of one or more system, sub-system, product, prototype, model, module, signal, network, or any one or more functionally-definable entity having one or more components, elements, cells, gates, transistors, blocks, circuits, interconnection, signals, state machines, storage, logic devices, machines, apparatus, compositions, instructions, steps, operations, processes, or other identifiable, actual or virtual design property, character, functionality or restriction, constraint or other limitation thereof.

As described herein, it is contemplated that designs 12 refer to electronic digital and/or analog system or circuit designs and related or cooperating software, micro-code or other associated fixed or reconfigurable hardware implementation, as well as product designs which is developed for other scientific and industrial applications, such as mechanical, medical, transportation, communications, or other technological areas involving system development generally, where product prototyping typically involves use of advanced design tools.

Network 30 is embodied in one or more wired and/or wireless digital communications line, link, coupling, connection, path, channel, cable, switch, bridge, router, or other functionally equivalent hardware or software resource, controller, database or user interface for enabling electronic information, packet, cell, message, frame, or other data transfer, transmission, or signaling between one or more private or local, local or wide-area networking ports, computers, processors, nodes, clients, servers, or other communications entity coupled or connectable thereto.

Preferably, network 30 is implemented using so-called Internet and World-Wide Web electronic connection, interface, or access for sending, receiving, controlling, compressing, encrypting, storing, or modifying electronic data files between computers according to conventional or standard networking protocol and equipment, which published or on-line-accessible specifications are hereby incorporated by reference (e.g., HTTP, TCP/IP, Ethernet, ATM, FDDI, HTML, XML, etc.)

Tool source 32 is embodied in one or more computer, processor, node, workstation, server, or other equivalent processing unit connectable to network 30 for providing, delivering, transmitting, sending or otherwise electronically sourcing or providing access through network 30, one or more software and/or hardware tools 14 or portions, components, or partial instructions, commands or elements thereof, for product function development and/or verification, such as computer-aided design and engineering programs as transacted, requested, modified, implemented, used, or as otherwise described herein.

Tool source 32 is commercial or private program or applications vendor, distributor, supplier or other source for providing network access to, or otherwise electronically convey, design software tool or related data or informational releases, technical or product literature, updates, edits, changes, revisions, improvements, or verifications, in specified file format, condition or state, upon customer or user request, subscription, licensing, trial, review, evaluation, or usage indication.

Component source 34 is embodied in one or more computer, processor, server, node, workstation, or other equivalent processing unit connectable to network 30 for providing, delivering, transmitting, sending or otherwise electronically sourcing or providing access through network 30, one or more software and/or hardware components or partial portions, instructions, commands, programs, applications, netlists, vectors, models, or elements thereof, for product function development and/or verification, such sourced component including one or more electrical or electronic signal, instruction, program or other computer-readable representation, specification, or characterization of one or more system, sub-system, product, prototype, model, module, signal, network, functionality, or any one or more functionally-definable entity having one or more components, elements, cells, gates, transistors, blocks, circuits, interconnection, signals, state machines, storage, logic devices, machines, apparatus, compositions, instructions, steps, operations, processes, or other identifiable, actual or virtual design property, character, behavior, functionality, or restriction, constraint or other limitation thereof.

For example, component source 34 is commercial or private program or applications vendor, distributor, supplier or other source for providing network access to, or otherwise electronically convey electronic circuit, system, or interconnect design files, virtual functional components, as well as any software or related data, informational releases, technical or product literature, updates, edits, changes, revisions, improvements, or verifications, in specified file format, condition or state, upon customer or user request, subscription, licensing, trial, review, evaluation, or usage indication.

Fabrication site 36 is embodied in one or more manufacturing, assembly, configuring, design, testing or processing facility for producing one or more components or designs, or components or designs for producing therefor, preferably developed, defined, specified, verified, modified, or otherwise provided, at least in part, in electronic or electrical signal or file format by one or more design platform 10 coupled thereto through network 30.

Preferably, fabrication site 36 comprises one or more computer, processor, server, node, workstation, or other equivalent processing unit with network communication interface equipment and/or drivers connectable to network 30 for electronically receiving or sending one or more electrical or electronic signal, instruction, program or other computer-readable representation, specification, or characterization of one or more system, sub-system, product, prototype, model, module, signal, network, functionality, or any one or more functionally-definable entity having one or more components, elements, cells, gates, transistors, blocks, circuits, interconnection, signals, state machines, storage, logic devices, machines, apparatus, compositions, instructions, steps, operations, processes, or other identifiable, actual or virtual design property, character, behavior, functionality, or restriction, constraint or other limitation thereof.

For example, server computer in fabrication site 36 may receive electronically through Internet network 30 modified chip layout file for producing photomask manufacturing materials according to particular semiconductor process specifications to enable manufacturing of certain system or circuit design.

Prototype 38 is embodied in one or more actual or actually-implementable discrete or embedded product design comprising digital and/or analog system or circuit designs and related or cooperating software, micro-code or other associated fixed or reconfigurable hardware implementation, including any product design which is developed for other scientific and industrial applications, such as mechanical, medical, transportation, communications, or other technological areas.

Preferably, prototype 38 includes or couples to one or more computer, processor, node, server, workstation, or other equivalent processing unit with network communication interface equipment and/or drivers connectable wired or wirelessly to network 30 for electronically receiving or sending one or more electrical or electronic signal, instruction, program or other computer-readable representation, specification, or characterization of one or more system, sub-system, product, prototype, model, module, signal, network, functionality, or any one or more functionally-definable entity having one or more components, elements, cells, gates, transistors, blocks, circuits, interconnection, signals, state machines, storage, logic devices, signal processors, machines, apparatus, compositions, instructions, steps, operations, processes, or other identifiable, actual or virtual design property, character, behavior, functionality, or restriction, constraint or other limitation thereof. Prototype 38 is defined, implemented, configured, programmed or modified accordingly by one or more design platform 10 accessible thereto through network 30.

For example, server processor in prototype 38 may receive or down-load electronically through Internet network 30 reconfigured circuit functionality or reprogrammed software file for remotely modifying implementation of prototype 38 operation, logic, behavior, function, storage, state, condition, or other signal or data processing characteristic. In particular, prototype 38 may comprise one or more network-accessible relatively fixed, mobile, pedestrian or vehicular electronic device, multi-media content delivery, recording, capture or storage electronic product or design, home or business appliance or peripheral equipment, remote sensor or monitoring instrument, personal wireless communicator or portable computer, including reconfigurable electrical or electronic circuit, such as field programmable gate array (FPGA), programmable logic device (PLD), or other functionally or electrically reconfigurable circuit for implementing logic design, and/or microprocessor or controller unit having access to storage for receiving and executing various commands, instructions, software, and associated data.

Clearinghouse database 20 is embodied in one or more computer, server, processor, node, workstation, or other equivalent processing unit connectable to network 30 for controlling, transacting, providing, delivering, transmitting, sending, receiving, or otherwise electronically accessing through network 30, one or more database, information, files, or other object-oriented and/or relational data structure including one or more data indication, record, listing, index, or user entry which represents one or more buyer, seller, interested user or provider, customer, licenser, licensee, designer or other entity offering or desiring to transact or transfer according to one or more rule, regulation, term, guideline, or other clearinghouse specifications.

Preferably, clearinghouse database 20 serves to facilitate between one or more buyer 22 or seller 24 registered, entered, participated, or otherwise indicated therein conducting electronic transfer or sourcing of design rights for one or more software and/or hardware components or partial portions, instructions, commands, programs, applications, netlists, vectors, models, or elements thereof, for product function development and/or verification.

Figure 2:
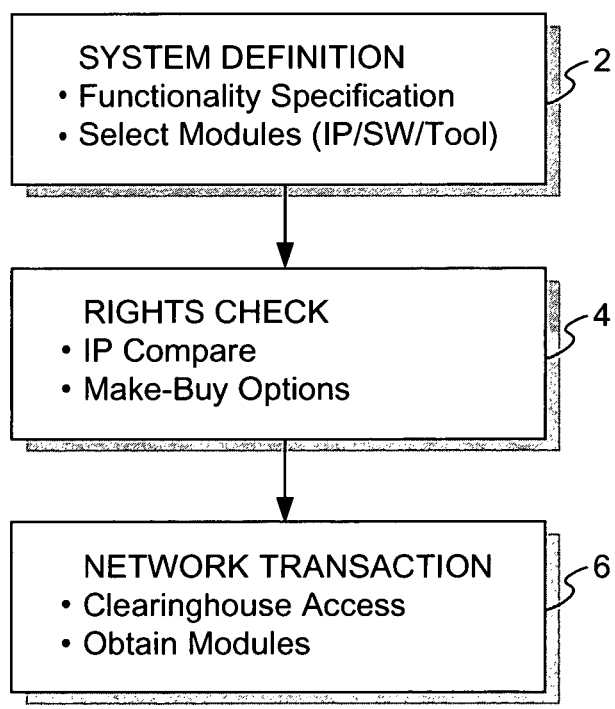
FIG. 2 is a generalized flow chart of methodology for system definition, rights checking, and on-line transaction, according to platform shown in FIG. 1.

FIG. 2 shows general method steps for system definition 2, including functional specification, and module selection; rights checking 4, including intellectual property rights comparison and make-buy option analysis; and on-line transaction 6, including clearinghouse database access, and obtaining modules.

In accordance with important aspect of present invention, design rights management and transaction are achieved in computer-assisted product development system. Generally, processor generates data structure representing product module, and compares functionality of data structure to functionalities in database to determine equivalence between data structure functionality and compared database functionality. Preferably, data structure represents electronic circuit design, and database includes electronic circuit design representations, so that electrical or logical equivalence between compared functionalities is determined. Functionality of data structure and functionality of other functionalities are provided at corresponding functional abstraction levels, so to that functionalities are compared at corresponding functional abstraction levels.

Moreover, data structure is modified and specified representing modified product module, such modified data structure having modified functionality equivalent to functionality of prior data structure at corresponding functional abstraction level. But modified functionality may not be equivalent to functionality of prior data structure at another functional abstraction level.

In addition, design platform processor producing prototype design or modification thereof couples over network connection for download and electrical configuration of actual product module. Preferably, design platforms indicates or signals upon determining functional equivalence or inequivalence functionality between data structure and other functionalities compared thereto. Furthermore, licensed data structure with functionality equivalent to functionality of prior data structure is provided over network using database indicating licensing sources. Preferably, licensed data structure includes parameters for manufacturing site.

Additionally, to transact design rights for electronic commerce according to present invention generally, source processor couples through network to design platform and transmits thereto functional signal indicating functionality, and such processor receives usage signal from platform using functional signal for design verification or implementation. Moreover, source processor may send modified functional signal of such functionality, and such processor receives other usage signal from design platform using modified functional module signal.

Figure 3:
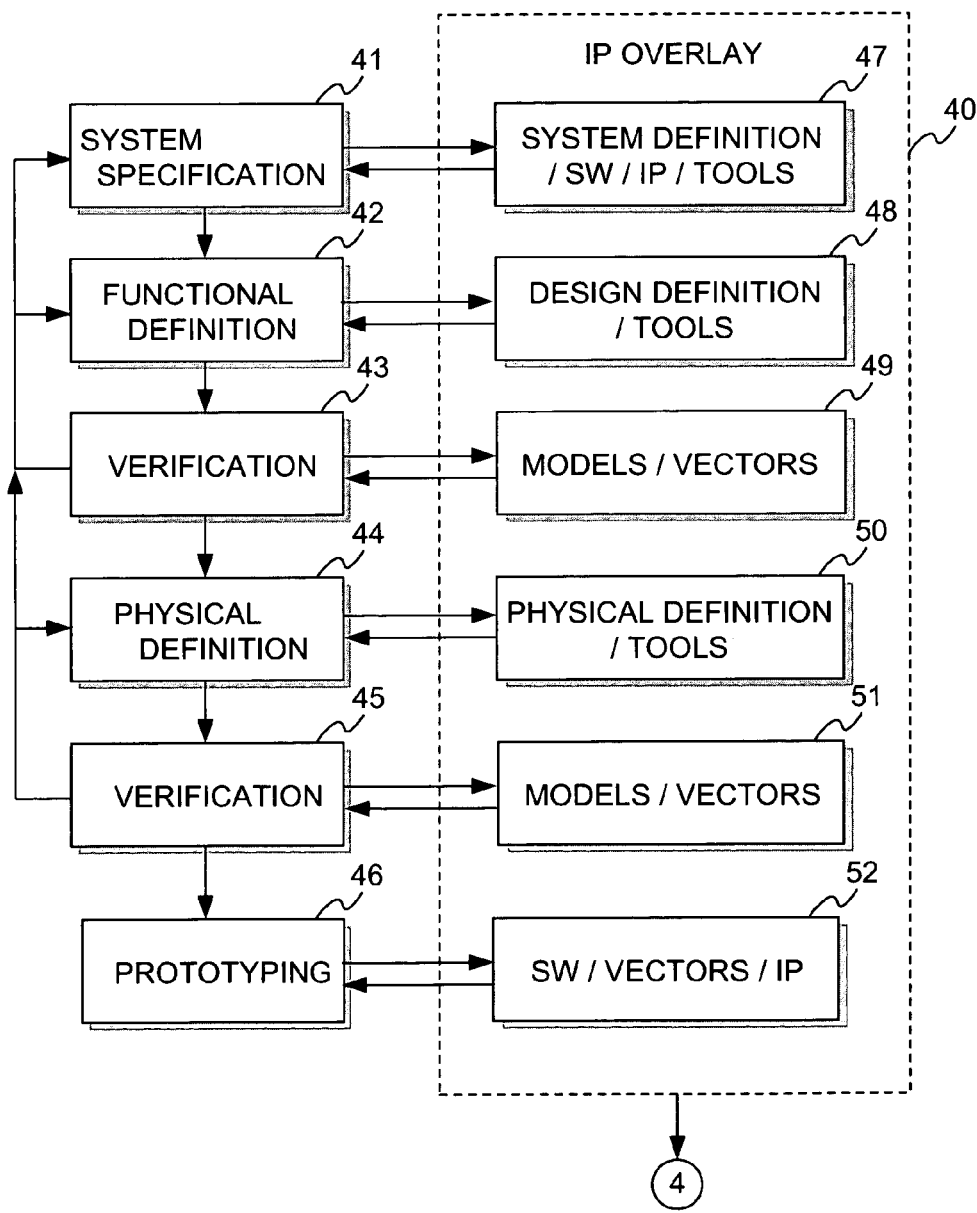
FIG. 3 is a diagram showing electronic design automation scheme including rights overlay for system definition, according to present invention.

FIG. 3 shows prototype system definition or product design automation process or scheme 2, preferably using electronic design automation (EDA) software and/or hardware for system specification 41, functional definition 42, verification 43, physical definition 44, verification 45, and prototyping 46. In accordance with aspect of present invention, intellectual property (IP) overlay is applied innovatively to EDA process 2.

System specification 41 include general definition of product architecture or module functionality overview at high level of abstraction, preferably specifying one or more major functional block or system component and one or more primary internal and/or external signal, datapath, line, interconnect, input/output interface.

For example, system specification 41 is accomplished by behavioral or logic synthesis (e.g., Verilog or VHDL file format), schematic capture (e.g., EDIF file format), or preliminary floor-planning of a prototype circuit, board or system design, whereby system specification 41 generates data structure, such as netlist, program, instructions, command, signal or other electronically recognizable message describing system definition at high-level functional abstraction. Optionally, output file or signal generated by system specification 41 is simulated or checked using simulation, emulation or testing tool for functional, circuit, logic or timing verification thereof, and possibly repeating specification 41 as appropriate.

Functional definition 42 receives and processes output data structure or signal from system specification 41 to generate more detailed functional definition of subject product or prototype at lower or more detailed level of abstraction than defined by specification 41, preferably specifying additional components, signal interconnect, operation, constraints, or other functionality.

Functional definition 42 can be accomplished by more specific logic or circuit design of general functional blocks provided by specification 41, whereby functional definition 42 generates data structure, such as netlist, program, instructions, command, signal or other electronically recognizable message describing system definition at lower or more detailed functional level of abstraction. Optionally, output generated by functional definition 42 is simulated or checked using simulation, emulation or testing tool for functional, circuit, logic or timing verification 43 thereof, and possibly repeating specification 41 and/or definition 42 as appropriate.

Physical definition 44 receives and processes output data structure or signal from functional definition 42 and/or verification 43 to generate more detailed functional definition of subject product or prototype at lower or more detailed level of abstraction than defined by definition 42, preferably specifying additional components, signal interconnect, operation, constraints, or other functionality including one or more physical attribute for actual implementation thereof.

Physical definition 44 can be accomplished by more specific logic or circuit design of product or prototype functionality provided by definition 42, whereby physical definition 44 generates data structure, such as netlist, program, instructions, command, signal, placement, routing, layout, photomask generation, or other electronically recognizable message describing system definition at lower or more detailed functional level of abstraction including one or more physical attribute thereof. Optionally, output generated by physical definition 44 is simulated or checked using simulation, emulation or testing tool for functional, circuit, logic or timing verification 45 thereof, and possibly repeating specification 41 or definition 42 as appropriate.

Prototyping 46 receives and processes output data structure or signal from physical definition 44 or verification 45 for implementation of subject design or product prototype in physical form by manufacturing site 36 or electronically reconfigurable form by prototype 38, such as one or more Application Specific Integrated Circuit (ASIC), Field Programmable Gate Array (FPGA), Programmable Logic Device (PLD), microcontroller, signal processor, or other digital and/or analog system or circuit designs and related or cooperating software, micro-code, compiler or other associated fixed or reconfigurable hardware implementation.

Intellectual Property (IP) overlay 40 comprises one or more files, programs, instructions, commands, signals or other electronic information, applicable to, or obtainable from, one or more application programs for specification, definition, verification or prototyping of system design tool suite 2. As used herein, term IP refers generally or collectively to one or more legally enforceable exclusive rights or interests thereof, such as trade secrets, copyrights, maskworks, patents, trademarks, and other licensable technology or industrial rights, including any physical, functional or virtual implementation, manifestation, combination, operation, or other embodiment thereof.

In context of electronic circuit or system design as described in preferred rights management and transaction scheme herein, IP overlay 40 is software or related hardware in design platform 10 for selectively or programmably providing access to or obtaining from system specification 41, functional definition 42, verification 43, physical definition 44, verification 45, or prototyping 46 one or more software and/or hardware components, including instructions, data files, control instructions, commands, programs, applications, netlists, vectors, models, elements, or any modification, constraint, or partial portion thereof.

In particular, IP overlay 40 may serve to apply or extract:
 (a) system, circuit or logic definition or specification, software programs, design tools or other electronic signal or files embodying IP 47, preferably at high-level functional abstraction, to system specification 41;
 (b) system, circuit or logic definition or specification, software programs, design tools or other electronic signal or files embodying IP 48, preferably at lower-level functional abstraction, to functional definition 42;
 (c) simulation or test programs, models or vectors or other electronic signal or files embodying IP 49, preferably at lower-level functional abstraction, to verification 43;
 (d) system, circuit or logic definition or specification, software programs, design tools or other electronic signal or files embodying IP 50, preferably at low-level functional abstraction, to physical definition 44;
 (e) simulation or test programs, models or vectors or other electronic signal or files embodying IP 51, preferably at low-level functional abstraction, to verification 45; or
 (f) system, circuit or logic definition or specification, software programs, design tools, simulation or test programs, models or vectors or other electronic signal or files embodying IP 52, preferably at low-level functional abstraction, to prototyping 46.

Hence, system specification 2 operates generally using IP overlay 40 to apply or extract certain electronic design rights information to or from development tool methodology. IP overlay 40 generate one or more requested or selected output files, functionality specifications or associated signal or other electronically processable data format for IP rights checking, comparison, screening, or qualifying 4 according to aspect of present invention.

Figure 4:
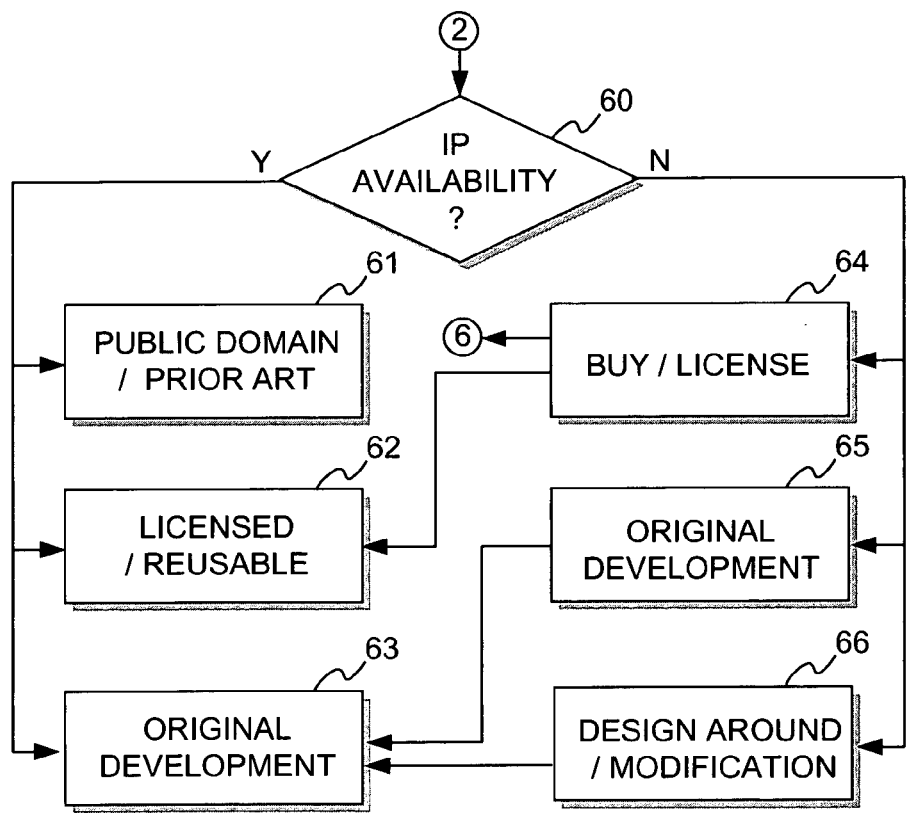
FIG. 4 is a diagram showing rights processing according to present invention.

FIG. 4 shows rights processing 4 methodology, preferably implemented as software and/or related hardware in design platform 10, for analyzing, qualifying and/or comparing IP rights associated with one or more selected, extracted, defined, or specified functionality file or related signal.

Initially, computer-implemented methodology or procedure 4 receives or is provided access to one or more file or signal output or generated from system definition 2, indicating candidate, unqualified, or newly-modified, reconfigured, programmed, defined or specified system, logic, circuit, product, prototype or other modular functionality implemented, specified, or represented in software, hardware, program, instruction, command, data file, or other electronic signal.

Generally, procedure 4 may compare, balance, measure, assess, monitor, analyze, predict or otherwise determine 60 riskiness, vulnerability, acceptability, ownership, qualification, suitability, compatibility, licensability, cost, usability, availability, or other IP rights status or condition of subject system or prototype design functionality selected for consideration, verification or implementation in product development.

Preferably, procedure 4 executes software to compare one or more functionality of selected or candidate system, logic, circuit design file or signal against or with one or more functionality specified, defined, or otherwise provided or producible in database, list, library, or other associative information set accessible or stored locally or remotely, on other processor or computing node through network 30, to current design platform 10 to determine or signal rights availability thereof.

Procedure 4 may perform such functional analysis effectively by conducting component and/or signal comparison at one or more abstraction level, such as system top architecture, logic block, circuit transistor gate, or physical device and interconnect layout. In this systematic and/or hierarchical screening manner, procedure 4 may indicate, calculate or otherwise signal when none, all some portion of functionality, component, interconnect are determined to be present or absent.

Hence, procedure 4 may clear, flag, pre-qualify or generate indication per functionality comparison of system, product, design, circuit, module, tool, program or other signal or file set selected, showing clearance, proportion, ratio, percentage, degree or other relative, quantified or measured value indicating, for example, likelihood of IP infringement, source indemnification need, prior-art anticipation, public domain scope, implementation risk, license coverage, original development, etc. Furthermore, such value determination per subject design functionality may serve to assist, suggest, analyze or guide develop/make-buy/license decision or choice, as well as evaluate or manage need, difficulty, scope, cost, effort or otherwise engineering, manufacturing or implementation burden to consider or pursue original development, modification or effective design-around of product functionality or prototype design.

Based on such quantified analysis to determine licensing exposure, as well as computer-based checking of one or more database, list or other set of established, market or estimated fees per design module functionality, procedure 4 may provide accrued estimated cost or license fee calculation for system design or portions thereof. Moreover, such analysis to determine licensing exposure is conducted on geographical or jurisdictional basis, for example, to calculate potential license fees only in countries or states where license rights are applicable for desired design functionality.

In particular, IP availability 60 is accomplished or signaled when procedure 4 comparison determines that candidate design is (or is not) functionally, behaviorally, logically, or substantially, equivalent, identical, similar, same, match or otherwise measurably comparable to one or more prior functionality provided or accessible thereto. In particular, IP availability is indicated or qualified when such comparison determines that candidate design is already present, specified, disclosed, suggested, or otherwise anticipated by one or more prior functionality available to public access or other publication 61, as indicated in or compared against one or more database and/or processor searchable and/or accessible electronically locally or over network 30 to current design platform 10.

Moreover, IP availability is indicated or qualified when such comparison determines that candidate design is already present, specified, disclosed, suggested, or otherwise anticipated by one or more prior functionality available under license, permission, authority or other rights provided by one or more source thereof 62, as indicated in or compared against one or more database and/or processor searchable and/or accessible electronically locally or over network 30 to current design platform 10.

Furthermore, IP availability is indicated or qualified when such comparison determines that candidate design is already present, specified, disclosed, suggested, or otherwise anticipated by one or more prior functionality available to user or designer associated with design platform 10 as having been developed originally 63 by such entity or affiliate or equivalent entity, as indicated in or compared against one or more database and/or processor searchable and/or accessible electronically locally or over network 30 to current design platform 10.

However, if procedure 4 automatically and/or manually determines 60 that candidate design rights for selected are not or unlikely to be available, then options for consideration include: buy or license 64, original development 65, or design around or modification 66.

Upon one or more design platform 10 generating system, circuit or logic definition or specification, software programs, design tools, simulation or test programs, models or vectors or other electronic signal, files or data structure embodying IP, preferably at appropriate functional abstraction level of desired prototype design or functionality, according to original development 65 and/or design around modification 66, such software-implemented procedure 4 causes one or more database accessible thereto to indicate original development 63 accordingly for further reuse of such originally-developed design functionality.

Design around or modification 66 is achieved initially by determining any functional equivalence between prototype functionality and other compared product functionalities, as described herein, at multiple corresponding functional abstraction levels. Then, when equivalence is determined at one level of functional abstraction, design functionality is modified at a different level. Candidate physical layout design being determined to be functionally equivalent to unlicensed physical functionality, and thus effectively unavailable, is shifted or transformed to higher-level abstraction level using software design tools to provide such functionality in logic block diagram form. Then, lower-level abstraction of physical functionality is regenerated or re-laid out in modified implementation, particularly having inequivalent circuit functionality according to substantially different transistor layout or electrical interconnect.

Alternately, modified design-around functionality is produced by generating in other or same level abstraction by using or replacing unavailable design portion with licensed, prior-art, or original functionality using software tools on design platform.

Optionally, originally-developed IP functionality is described or specified with appropriate formal notice, descriptive text and/or graphical illustration or diagram of system, logic, or circuit functionality implementation in computer-generated file. Such file is formatted for enabling or facilitating filing, registration, application, or drafting one or more document for perfecting or documenting associated intellectual property rights. Proper forms, outlines or drafts for formal submission of maskworks, copyrights, or patents pertaining to such originally-developed IP are computer-generated for further administrative processing.

Figure 5:
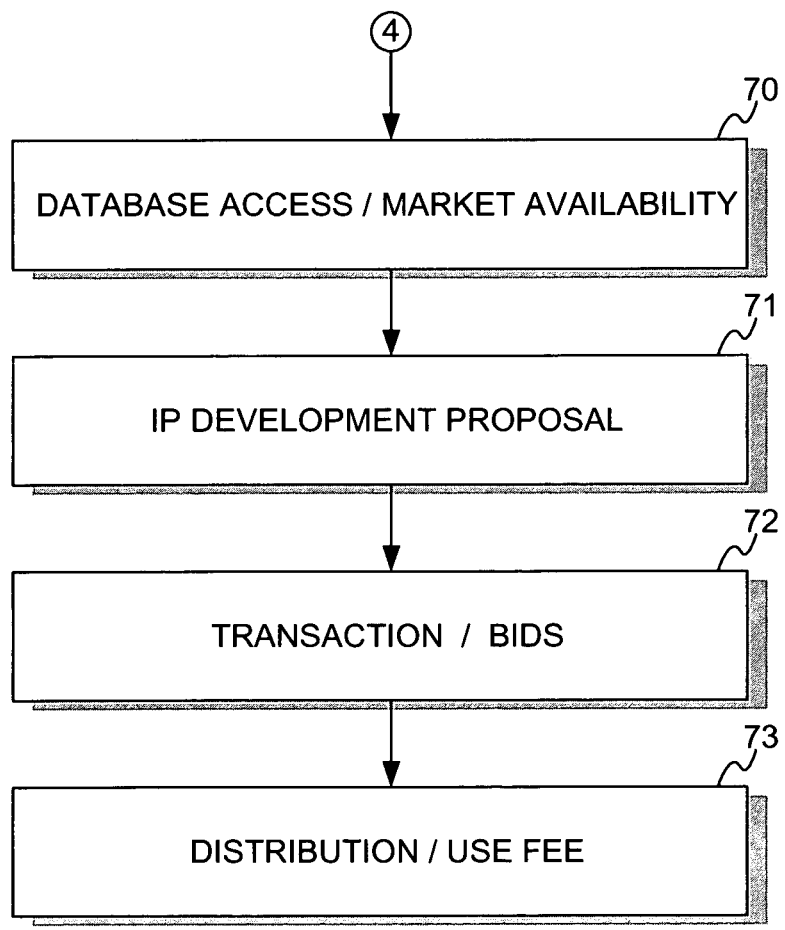
FIG. 5 is a diagram showing on-line transaction according to present invention.

FIG. 5 shows network commerce or on-line transaction steps 6, preferably arising upon invocation of buy/license 64 option by computer-assisted procedure 4. One or more steps 70, 71, 72, 73 are implemented or facilitated using one or more electronic or software-implemented intelligent agents functioning in network 30 on behalf of buyer/seller/licenser/licensee of design module functionality, tools, software, and any related data structure or hardware accessible thereto, preferably under secured and/or confidential terms and/or channels between transacting parties or processor nodes. Such agents may access one or more clearinghouse database 20 to identify market availability for design or IP functionality, transact or negotiate design development specifications, terms, and bids, as well as conduct and monitor distribution of functionality data structures as well as usage billing thereof.

Initially, currently-transacting design platform 10 accesses local or distributed clearinghouse database 20 through network 30 to determine market availability of unavailable candidate design functionality. In this way, designer or user may contact one or more database 20 to register as potential or interested buyer 22, and contact directly or indirectly through clearinghouse database 20 one or more potential seller 24 registered therein.

IP functionality or other prototype design requirement is provided 71 by current design platform user to propose general and/or specific terms and functional requirements, preferably using secured and specified format and communications channel through network 30. Such buyer/seller or licenser/licensee parties may iterate or repeat through one or more modifications of transaction terms until satisfactory thereto.

Then, one or more interested or qualified vendors, sources, designers, or other service or product providers bid, signal or transmit response through network 30. On-line commercial transaction 72 is consummated if one or more response bids, including particulars such as appropriate license rights, required functionality and cost payment schedule, are signaled to parties as acceptable terms to form contract or other agreeable relationship.

Moreover, one or more ordered design functionality data structure, file or signal, as described herein, is distributed 73 to requesting design platform 10, particularly for appropriate application by IP overlay 40 to various development steps 41, 42, 43, 44, 45, and/or 46, over network 30, and usage fee is payable or electronically acknowledged therebetween. If modified or updated of design functionality is provided, distributed, designed, executed, implemented, simulated, or verified by one or more such customer platforms, further usage fee is payable and electronically acknowledged (i.e., by indicating particular user, design platform, prototype implementation, or manufacturing site; product functionality, part number, and/or version; and time and/or place of delivery or usage.)

From time to time IP design vendor may transmit updated design functionality in electronic form to one or more potentially interested customers or subscribers, whereby execution or usage of such updated design files or signals operate, preferably automatically, to acknowledge or notify such vendor of each usage or reuse of subject functionality for proper billing.

Furthermore, such ordered design functionality data structure, file or signal, is electronically transmitted and/or distributed directly or indirectly over network 30 to one or more fabrication site 36 or actual prototype or product 38. When such functionality is provided to fabrication site 36, preferably one or more manufacturing process parameters or characteristics are included therewith, such that prototype production is optimized preferably according to particular fab site current or actual conditions.

Electronic device or product having embedded processor which executes down-loadable program functionality, or signal processor or other electrically reconfigurable logic or circuit which implements downloadable circuit functionality, as accessible through Internet coupling, is enabled to operate according to requested, modified, selected or directed design rights, product functionality, or other related data structure, files, or signals provided as specified herein.

Preferably, prototype 38 implements flexibly in reconfigurable or reprogrammable actual product form, as described herein, such functionality or design portions determined or signaled to be associated with higher level of rights burden, such as likelihood of infringement risk or higher usage license costs.

The foregoing described embodiments of the invention are provided as an illustration and description. It is not intended to limit the invention to the precise form described. Other variations and embodiments are possible in light of the above teaching, and it is thus intended that the scope of the invention not be limited by the detailed description, but rather by the claims as follow.

We claim:

1. In a computer-assisted product rights system comprising a processor and a storage coupled thereto, a software-implemented method for managing product rights, comprising the steps of:

generating by a processor a first data structure representing a product module and;

comparing by the processor a functionality of the first data structure to at least one compared functionality provided in a rights database provided in a storage and, the comparison of the functionality of the first data structure and the at least one compared functionality provided in the rights database being performed on at least one corresponding functional abstraction level; and providing an equivalence determination between the functionality of the first data structure and the at least one compared functionality provided in the rights database on at least one corresponding abstraction level, the equivalence determination permitting implementation of at least one permitted product right; and coupling via a network to a prototype to enable functional implementation of the at least one permitted product right, whereby the prototype comprises at least one of a product coupled to an appliance, the at least one of a product coupled to an appliance being at least one of configured for operation using a data structure and programmed for operation using a data structure, the data structure being provided by the processor for functional implementation for the prototype in accordance with the at least one permitted product right; and the functionality of the first data structure and the at least one compared functionality provided in the rights database on a plurality of corresponding functional abstraction levels, the processor comparing the functionality of the first data structure and the at least one compared functionality provided in the rights database on at least one corresponding functional abstraction level; and generating by the processor a modified data structure representing a modified product module, the modified data structure having a modified functionality which is equivalent to the functionality of the first data structure at a first corresponding functional abstraction level, but the modified functionality not being equivalent to the functionality of the first data structure at a second corresponding functional abstraction level; and coupling the processor to a product module; and electrically configuring the product module according to the modified functionality.

2. A computer-aided product rights management system comprising:

a processor;

a storage coupled thereto; and a program provided in the storage and executable by the processor for functional comparison to a rights library at least one functionality of at least one of an electronic circuit and a software design, the functional comparison being performed on at least one corresponding level of functional abstraction to determine whether the at least one functionality of the at least one of an electronic circuit and a software design is provided equivalently in the rights library, thereby managing rights by enabling selective application of corresponding rights information on the at least one level of functional abstraction about the at least one of an electronic circuit and a software design to at least one respective tool;

wherein the processor is coupled via a network effectively to provide at least one right in at least one of a product and appliance that is at least one of configurable for operation and programmable for operation using a data structure from the processor;

wherein the program determines functional equivalence at multiple abstraction levels; the program generating at least one of a modified circuit and a software design being functionally equivalent to the at least one of an electronic circuit and a software design at one abstraction level, but not functionally equivalent thereto at another abstraction level; the processor being coupled to a product module, and the program causing the product module to be configured electrically according to the at least one of a modified circuit and a software design.

* * * * *